No. 878,200. PATENTED FEB. 4, 1908.
S. GNAGY.
HUB ATTACHING DEVICE.
APPLICATION FILED MAR. 2, 1907.
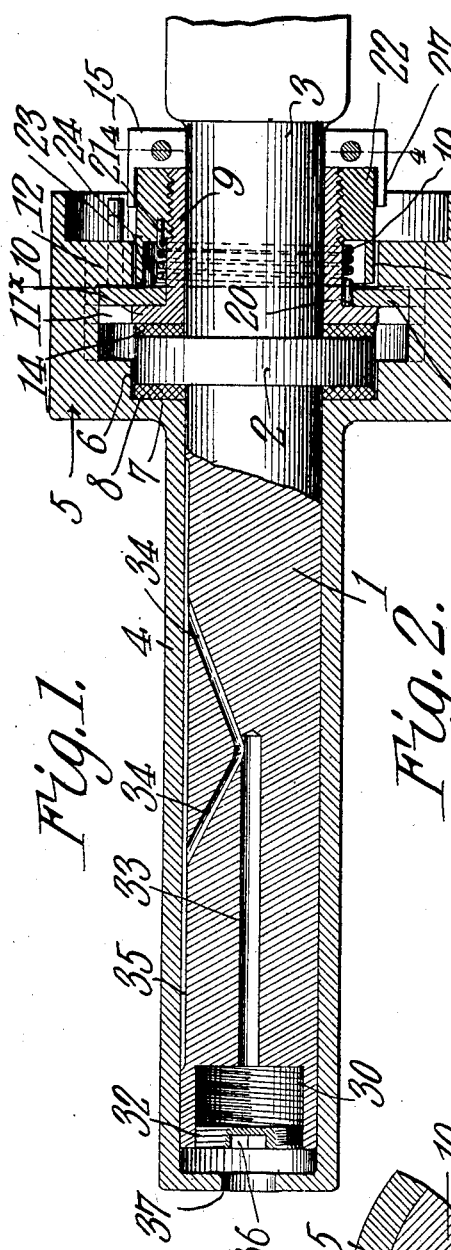
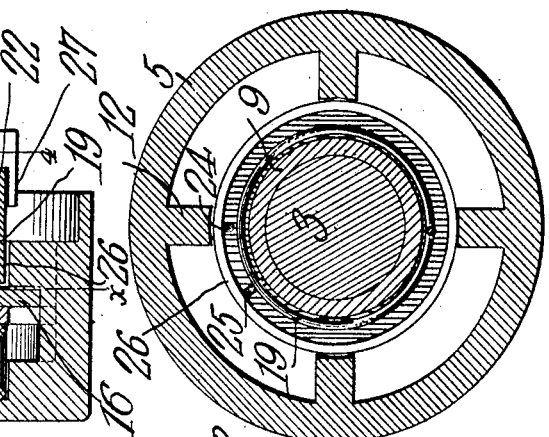
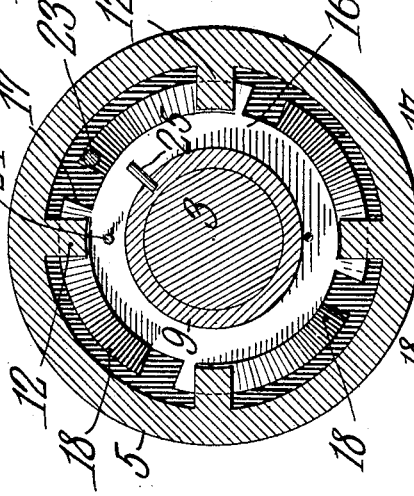
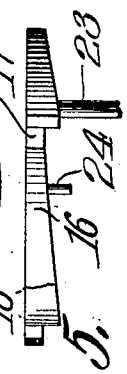
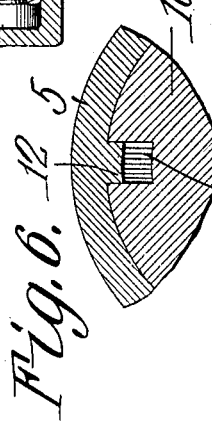
WITNESSES:
Samuel Gnagy,
INVENTOR.
By C.A. Snow & Co.
ATTORNEYS

UNITED STATES PATENT OFFICE.

SAMUEL GNAGY, OF STRASBURG, OHIO.

HUB-ATTACHING DEVICE.

No. 878,200.  Specification of Letters Patent.  Patented Feb. 4, 1908.

Application filed March 2, 1907. Serial No. 360,187.

*To all whom it may concern:*

Be it known that I, SAMUEL GNAGY, a citizen of the United States, residing at Strasburg, in the county of Tuscarawas and State of Ohio, have invented a new and useful Hub-Attaching Device, of which the following is a specification.

The present invention relates to improvements in devices for securing vehicle or similar wheels on their spindles or axles, and it has for its object to provide an improved device of this character that avoids the use of nuts or other detachable parts that are liable to become lost or loose and thus cause accidents, or to tighten by reason of friction the wheel hub so that they may lock the wheels, and, furthermore, it has for its object to provide such a device that is capable of being locked and unlocked with facility and certainty, and its parts cannot become lost or misplaced.

To these and other ends, the invention consists in certain improvements and combinations and arrangements of parts, all as will be hereinafter more fully described, the novel features being pointed out with particularity in the claims at the end of the specification.

In the accompanying drawings, Figure 1 represents a longitudinal section through an axle spindle and hub or sleeve having a retaining device thereon constructed in accordance with the present invention. Fig. 2 represents a transverse section on the line x—x of Fig. 1 looking toward the left. Fig. 3 represents a section on the same line looking toward the right. Fig. 4 represents a section on the line 4—4 of Fig. 1. Fig. 5 is an edge view of the retaining ring. Fig. 6 is a fragmentary section through a portion of the flange of the thrust collar, and the adjacent portion of the boxing of the sleeve.

Corresponding parts in the several figures are indicated throughout by similar characters of reference.

In the present embodiment of my invention, the spindle 1 on the usual axle is provided with an annular shoulder 2, and a bearing surface 3 is formed on the spindle in rear of the shoulder, the spindle in front of the shoulder being formed in the usual way to provide a journal for the axle box or sleeve 4. The latter is provided on its rear end with a box 5 which is larger in dimension than the remainder of the sleeve, and it has a recess shaped to receive the shoulder 2 of the spindle, a shoulder 7 being provided in the box opposite to the forward surface of the shoulder 2 and adapted to receive the usual washer 8 to sustain the end thrust of the axle relatively to the wheel in one direction.

Fitted loosely over the rear bearing surface 3 of the spindle is a thrust collar 9 having a cylindrical or sleeve portion fitting the bearing surface of the spindle and provided with a flange 10 at its forward end and lying in a plane substantially at right angles to the axis of the spindle. This flange is provided with a series of peripheral notches 11 adapted to receive the correspondingly arranged inwardly extending locking projections 12 formed on the box of the sleeve 4, as this will permit a relative longitudinal movement of the sleeve, and as the latter moves inwardly, the flange 10 will enter the box, and this collar serves to prevent relative inward movement of the spindle and the sleeve, as the washer 14 interposed between the front surface of the flange 10 thereof and the rear surface of the shoulder 2 on the spindle serves to prevent relative movement between the locking collar and the spindle in one direction, and a collar 15 firmly locked to the rear bearing surface 3 of the spindle engages the rear end of the locking collar and prevents relative movement between the latter and the spindle in the opposite direction, and the thrust collar in turn is suitably locked to the sleeve of the wheel.

The retaining device for holding the locking collar in fixed relation to the sleeve consists, in the present instance, of a rotatable disk 16 having a series of peripheral notches 17 adapted to permit the passage of the disk past the projections 12, and the surfaces of the disk between these notches are provided with web or cam surfaces 18 adapted to coöperate with the inner sides of the projections 12. Rotation of the disk serves to carry the notches out of line with the projections 12, thereby preventing disengagement of the flange 10 relatively to the box 5, and the cam action serves to draw the sleeve inwardly relatively to the spindle so that there will be no lost movement or end play between the shoulder 2 on the spindle and the coöperating portions of the sleeve and the flange 10 respectively. It is preferable to employ suitable means for holding the retaining disk in locked position, a device for accomplishing this purpose being shown in the present instance and consisting of a helical spring 19 having one end attached at 20 to the disk 16 and its opposite end attached at 21 to a ring 22 firmly secured on the exterior of the sleeve portion of the collar 9, the action of this spring normally tending to rotate the disk toward the right in Fig. 2 and thereby tighten the wedges thereon.

In order to permit operation of the retaining disk on the exterior of the bearing, a rearwardly projecting handle 23 is provided thereon and arranged to operate between two adjacent projections 12, and in order to limit the range of movement of the disk, a stop 24 is preferably provided on the disk and arranged to coöperate with a pin 25 fitted in the sleeve 9, the forward end of the latter being provided with a forwardly directed flange 26 adapted to form a housing for the spring 19, and it also serves to prevent entrance of dust to the interior of the bearing. The collar 15 also serves the dual purpose of forming a stop to receive the end thrust of the collar 9, and it has a sand band 27 extending forward therefrom and overlapping the surface of the adjacent ring 22, the band serving to conceal the joint formed between the collar 15 and the rear coöperating portion of the collar 9.

When it is desirable to remove the wheel from the axle, the handle 23 is moved toward the left and this serves to bring the peripheral notches 17 in the retaining disk into registration with the locking projections 12, and while the parts are in this position, the sleeve for the wheel may be withdrawn from the spindle as the notches 11 in the flange 10 permit the passage of the projection 12, and in replacing the wheel, the handle 23 is operated to turn the retaining disk until its notches register with those of the flange 10, and with the parts in this position, the wheel is slipped onto the spindle in such a way that the projections 12 pass through these notches, and when the shoulder 7 of the sleeve is in the proper coöperative relation with the shoulder 2, the narrow portions of the wedge surfaces 18 on the retaining disk may enter behind the locking projections, and rotation of the retaining disk serves to take up end thrust between the sleeve and the shoulder on the spindle. The spring, operating on this disk, serves to prevent backing of the wedges on the retaining disk and also serves to automatically take up any end thrust that may be present.

A novel lubricating device is also shown in the present embodiment of the invention that is capable of feeding oil or grease to the inner bearing surfaces without the necessity of removing the wheel from the axle, and this device comprises, in its present form, a threaded chamber 30 forming a receptacle or reservoir for the lubricant, and a plunger having a correspondingly threaded head 32 is mounted to operate axially within this chamber for expelling the lubricant therefrom. The lubricant is conducted from this chamber by means of an axial passage 33 and one or more passages 34 extending outwardly from the axial passage to the coöperating bearing surfaces of the spindle and sleeve, a pair of divergently arranged passages, as shown being preferable, and by arranging the passages 34 so as to discharge in a longitudinal groove 35 formed in the journal portion of the spindle, the lubricant is applied to a larger surface of the sleeve. In order to permit the lubricant to be fed from the exterior of the bearing, the plunger is provided preferably with a square or angular recess 36 to receive a suitable wrench which enters through an opening 37 on the forward end of the bearing sleeve in order that this stem may be readily manipulated from the exterior of the bearing.

A device of this character constructed in accordance with my present invention is capable of being readily and easily operated to lock or unlock the wheel relatively to the axle, and when its parts are in unlocked position, they cannot become lost, and the wedge portions on the retaining disk serve to compensate for any endwise movement that may be present, due to wear, while the lubricating device is also particularly adapted for use on vehicles having bearings of this general type, as it enables the lubricant to be supplied to the bearing surfaces without the necessity of removing the wheel from the axle.

What is claimed is:—

1. The combination with a spindle having a peripheral shoulder thereon, of a bearing sleeve fitting the spindle having a shoulder coöperating with that of the spindle to prevent relative longitudinal movement of the parts in one direction, a collar held from relative longitudinal movement on the spindle, and a rotatable retaining device forming an operative connection between the sleeve and said collar for preventing relative longitudinal movement of these parts.

2. The combination with a spindle having a peripheral shoulder thereon, of a bearing sleeve fitted over said spindle and having a portion arranged to coöperate with said shoulder to receive the end thrust of the parts in one direction, a set of locking projections formed on a part of the sleeve, a collar on the spindle arranged to coöperate with the shoulder thereon, and a retaining disk coöperating with said locking projections to prevent relative end thrust between the sleeve and said collar.

3. The combination with a spindle having a shoulder thereon, of a sleeve fitted over the spindle and having a portion adapted to coöperate with one side of said collar, a thrust collar fitted loosely over the shaft at the rear of said shoulder having a portion arranged to coöperate with it at its rear, a set of locking projections formed on the sleeve, and a rotatable retaining disk having notches adapted to permit the passage of said projections and provided with wedge surfaces to coöperate with said projections to take up end thrust between the shoulder on the spindle and the sleeve and collar.

4. The combination with a spindle having a peripheral shoulder thereon, of a sleeve fitted to turn on said spindle and having a portion adapted to coöperate with the forward surface of the shoulder, a collar loosely fitted on the spindle and having a flange adapted to coöperate with the rear surface of said shoulder, said flange having notches in its periphery, a set of locking projections on the sleeve adapted to pass through the notches in said flange in removing or applying the sleeve, and a retaining disk rotatable relatively to the sleeve and collar and having notches to permit the passage of the locking projections when the disk is in unlocked position and having portions arranged to coöperate with said projections to lock the collar in coöperative relation with the sleeve.

5. The combination with a spindle, and a bearing sleeve fitted to turn thereon, of a rotatable retaining device for preventing relative axial disengagement of the spindle and sleeve, and means for holding the said device in different rotary positions of adjustment to compensate for the end thrust.

6. The combination with a spindle having a peripheral shoulder thereon, of a bearing sleeve mounted on the spindle, a thrust collar arranged to coöperate with said shoulder to sustain the end thrust between the sleeve and spindle, a retaining member having wedge portions thereon coöperating with the sleeve for moving and holding the thrust collar in coöperative relation with said shoulder, and a spring normally operating on said device for automatically taking up end play between the sleeve and spindle.

7. The combination with a spindle having a peripheral shoulder thereon, and a bearing sleeve coöperating with the shoulder having a portion arranged to engage the forward side of said shoulder to sustain the end thrust between the sleeve and spindle in one direction, and provided with a set of inwardly extending locking projections, of a thrust collar loosely mounted on the spindle and having a flange adapted to coöperate with the rear side of said shoulder, means for holding said flange in coöperative relation with said shoulder, and a retaining disk having peripheral notches arranged to permit the passage of the projections on the sleeve and arranged to coöperate with said projections to lock the thrust collar and sleeve in coöperative relation.

8. The combination with a spindle having a peripheral shoulder thereon, and a bearing sleeve fitted to turn on the spindle having a portion adapted to coöperate with one side of said shoulder and having a set of inwardly extending locking projections arranged on the other side thereof, of a thrust collar fitted loosely on the spindle having a flange adapted to coöperate with the shoulder, the periphery of the flange being notched to permit the passage of said locking projections in applying and removing the sleeve, a retaining disk rotatably mounted on said thrust collar having notches permitting the passage of said projections and provided with wedge portions arranged to coöperate with said projections to lock the thrust collar in fixed relation to the sleeve, and a spring interposed between the thrust collar and retaining disk and normally operating to tighten the wedges on the latter.

9. The combination with a spindle having a peripheral shoulder thereon, and a bearing sleeve fitted on the spindle and coöperating with said shoulder to prevent relative axial movement in one direction, of a thrust collar mounted on the spindle at the rear of the shoulder thereon and having a flange adapted to coöperate with the rear side of said shoulder, a stop collar rigidly secured to the spindle and coöperating with said thrust collar to retain the latter in coöperative relation with said shoulder, a flange on the stop collar overlapping the thrust collar to exclude the dust from the joint between the two collars, and suitable means interposed between the thrust collar and sleeve for retaining them in fixed relation.

10. The combination with a spindle having a peripheral shoulder thereon, of a bearing sleeve revoluble on the spindle and having a portion adapted to coöperate at one side of the said shoulder to prevent relative end movement in one direction, a rotatable retaining disk arranged to operate at the opposite side of the said shoulder and provided with wedge surfaces coöperating with portions of the bearing sleeve for taking up end thrust between the latter and spindle when the retaining disk is rotated relatively to the sleeve.

11. The combination with a spindle having a peripheral shoulder thereon, of a bearing sleeve revoluble on the spindle having a portion coöperating at one side of the shoulder and having a set of inwardly extending locking projections, a rotatable retaining disk arranged at the opposite side of the said shoulder having a set of wedges arranged to coöperate with the said projections and to take up end thrust between the spindle and sleeve as the disk is rotated relatively to the latter, and a device for preventing retrograde movement of the disk.

12. The combination with a spindle having a peripheral shoulder thereon, and a bearing sleeve journaled thereon having a portion adapted to coöperate with the forward side of said shoulder to prevent end thrust of the sleeve in one direction, and a housing formed at one end of said sleeve having a set of locking projections therein, of a thrust collar loosely mounted on the spindle and having a flange coöperating with the rear side of said shoulder, said flange being notched to permit entrance of the locking projections, and a retaining ring rotatable relatively to said flange and having notches adapted to register therewith to permit passage of said projections in removing or inserting of the sleeve, and coöperating with said projections to lock the flange when rotated relatively thereto.

In testimony that I claim the foregoing as my own, I have hereto affixed my signature in the presence of two witnesses.

SAMUEL GNAGY.

Witnesses:
J. A. FERNSELL,
PHILIP ZEIGLER.